(12) United States Patent
Katou et al.

(10) Patent No.: US 7,399,021 B2
(45) Date of Patent: Jul. 15, 2008

(54) PRESS-MOLDED DOOR BEAM FOR A VEHICLE, HAVING A LONGITUDINAL GROOVE PART PROTRUDING AT THE BEAM END

(75) Inventors: Masahiro Katou, Shioya-gun (JP);
Futoshi Kobayashi, Moka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/641,571

(22) Filed: Dec. 19, 2006

(65) Prior Publication Data
US 2007/0145770 A1 Jun. 28, 2007

(30) Foreign Application Priority Data
Dec. 27, 2005 (JP) .............................. 2005-374507

(51) Int. Cl.
*B60J 7/00* (2006.01)
(52) U.S. Cl. .................................................. 296/146.6
(58) Field of Classification Search ............... 296/146.6
See application file for complete search history.

(56) References Cited

U.S. PATENT DOCUMENTS 6,398,289 B1 * 6/2002 Gehringhoff ............. 296/146.6
6,869,130 B2 * 3/2005 Bodin et al. ............. 296/146.6
6,890,019 B2 * 5/2005 Leistra et al. ............. 296/146.6
2002/0043817 A1 * 4/2002 Gehringhoff et al. ..... 296/146.6

FOREIGN PATENT DOCUMENTS

JP 09-226369 9/1997

* cited by examiner

*Primary Examiner*—Joseph D Pape
(74) *Attorney, Agent, or Firm*—Carrier Blackman & Associates, P.C.; William D. Blackman; Joseph P. Carrier

(57) ABSTRACT

A structure of a door beam arranged inside a main body of a door in a vehicle. The door beam is press-molded, a recessed groove part is formed in the door beam along its extending direction, and an end of the groove part protrudes outward from an end of the door beam in the extending direction. In the groove part, an end part may have a deeper groove in comparison with a groove in a central part along the extending direction, or a plurality of groove lines may be formed in a central part along the extending direction, and they may be gradually transformed into a single groove in an end part. Preferably, the groove part protrudes outward in the extending direction, from a joint part of the door beam, which is provided for joining said end of the door beam to the main body of the door.

15 Claims, 5 Drawing Sheets

PRESS-MOLDED DOOR BEAM FOR A VEHICLE, HAVING A LONGITUDINAL GROOVE PART PROTRUDING AT THE BEAM END

BACKGROUND OF THE INVENTION

1. Field of the Invention

The present invention relates to the structure of a door beam arranged in a main body of a door in a vehicle.

Priority is claimed on Japanese Patent Application No. 2005-374507, filed Dec. 27, 2005, the content of which is incorporated herein by reference.

2. Description of the Related Art

In a known door beam structure, an end of a door beam, made from a steel pipe, is cut diagonally so as to improve the yield and reduce the weight thereof (see Japanese Unexamined Patent Application, First Publication No. H9-226369).

In the above conventional structure, the closer to the head of the door beam, the smaller the rigidity of the beam. Therefore, a measure for suppressing such a decrease in the rigidity is required, and such a measure may cause complication of the process for manufacturing the door beam. In order to solve this problem, the door beam may be made by press-molding so as to improve flexibility for design. However, also in this case, it is necessary to sufficiently consider improvement of the yield and reduction of the weight.

SUMMARY OF THE INVENTION

In light of the above circumstances, an object of the present invention is to provide a door beam structure for simplifying the manufacturing process thereof, improving the yield, and reducing the weight.

Therefore, the present invention provides a structure of a door beam (e.g., a door beam 40 in an embodiment explained later) arranged inside a main body (e.g., a door main body 3 in the embodiment) of a door (e.g., a front door 2 in the embodiment) in a vehicle (e.g., a vehicle 1 in the embodiment), wherein:

the door beam is press-molded;

a recessed groove part (e.g., a groove part 44 in the embodiment) is formed in the door beam along its extending direction; and an end of the groove part protrudes outward from an end of the door beam in the extending direction.

In accordance with the above structure, only the groove part having high rigidity is protruded from an end of the door beam, thereby increasing the effective lap width between the door beam and the vehicle body by the protruding length of the groove part. Therefore, it is possible to improve the rigidity in the event of an impact against the door while the weight of the door beam can be reduced. In addition, the groove part can protrude from the end of the door beam (i.e., after the press-molding) in accordance with the cut shape of the base member (i.e., before the press-molding), thereby allowing simplification of the manufacturing process of the door beam.

In the groove part, an end part may have a deeper groove in comparison with a groove in a central part along the extending direction. Such a shallow groove in the central part contributes to space-saving in the central part of the door beam in its extending direction, while such a deep groove in the end part contributes to improving the rigidity in the event of an impact against the door.

In a preferable example, in the groove part, a plurality of groove lines are formed in a central part along the extending direction, and they are gradually transformed into a single groove in an end part along the extending direction. In this case, a plurality of relatively shallow grooves are formed in the central part in the extending direction of the door beam so as to provide desired rigidity and a space-saving effect. In contrast, at the end part of the door beam, a relatively deep single groove is formed so that relatively wide flat parts can be secured for fastening the door beam to the door main body. Therefore, the rigidity of the door beam can be secured uniformly along its extending direction, and simultaneously, a sufficient width for fastening the door beam to the door main body can be secured without increasing the vertical width of the end part of the door beam. Accordingly, it is possible to increase the yield with respect to the press-molding of the door beam.

In a typical example, the groove part protrudes outward in the extending direction, from a joint part (e.g., a rear joint part 42 in the embodiment) of the door beam, which is provided for joining said end of the door beam to the main body of the door. Accordingly, the joint part is not formed excessively close to the edge of the door beam. Therefore, the door beam can be stably fastened, and the protruding groove part contributes to improving the rigidity in the event of an impact against the door.

In another typical example, upper and lower edges of the door beam are each substantially straight over the entire length of the beam.

In another typical example, a base material for press-molding the door beam has upper and lower edges which are each substantially straight over the entire length of the base material.

DETAILED DESCRIPTION OF THE INVENTION

Hereinafter, an embodiment in accordance with the present invention will be described with reference to the appended figures. In the following explanations, directions such as front, back, right, and left coincide with those of the vehicle if no specific explanation is provided. Additionally, in the figures, arrows indicated by reference symbols FR, LH and UP respectively designate the front side, the left side, and the upper side of the vehicle.

Figure 1:
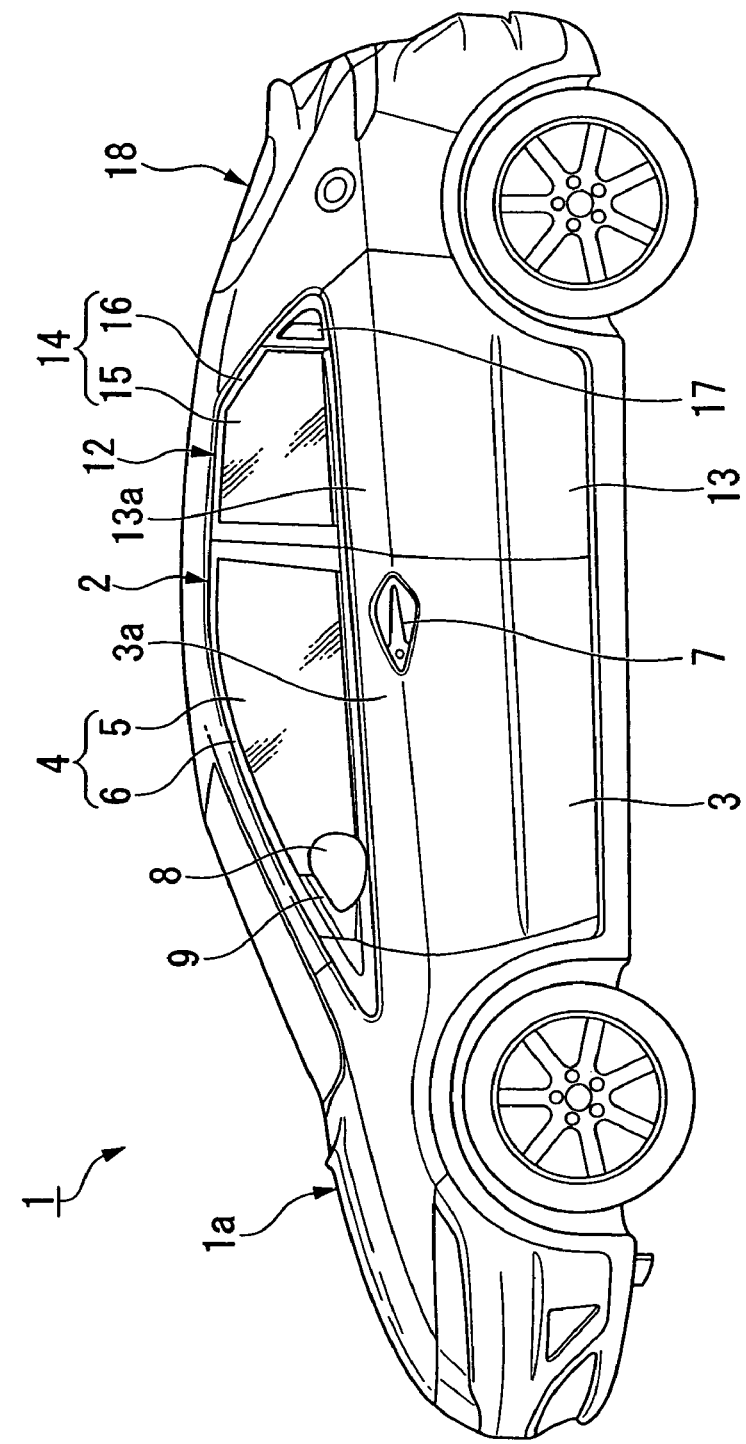
FIG. 1 is a side view showing a vehicle to which an embodiment in accordance with the present invention is applied.

FIG. 1 is a side view showing a vehicle 1 in the embodiment. The vehicle 1 is a two-box type, and has a vehicle body 1*a* having a monocoque structure in which panel parts and vehicle-body frame parts are joined integrally to each other. Openings provided on each side of the vehicle are closed and opened using a front door 2 and a rear door 12. The front door 2 consists of a door main body 3 as a lower part of the door and a window part 4 as an upper part of the door, which are formed integrally, and the rear door 12 also consists of a door main body 13 and a window part 14 which are formed integrally.

The window part 4 has main elements such as a door windowpane 5 and a sash 6, and similarly, the window part 14 has main elements such as a door windowpane 15 and a sash 16. The area surrounded by the sash 6 and a waist part 3a which is an upper end portion of the door main body 3 is closed and opened by raising and lowering the door windowpane 5. Similarly, the area surrounded by the sash 16 and a waist part 13a which is an upper end portion of the door main body 13 is closed and opened by raising and lowering the door windowpane 15.

The front door 2 and the rear door 12 are each opened and closed around a hinge axis arranged at the front end (i.e., base end) of the door, along the substantially vertical direction.

A door outer handle 7 for opening and closing the front door 2 from the outside of the vehicle is provided at an upper-rear position in the door main body 3. A door outer handle 17 for opening and closing the rear door 12 from the outside of the vehicle is provided at a rear end position in the window part 14.

A mirror base plate 9 for supporting a door mirror 8 is attached to the front end of the window part 4 in the front door 2. In addition, reference numeral 18 indicates a tail gate for opening and closing an opening provided on the back side of the vehicle body.

Figure 2:
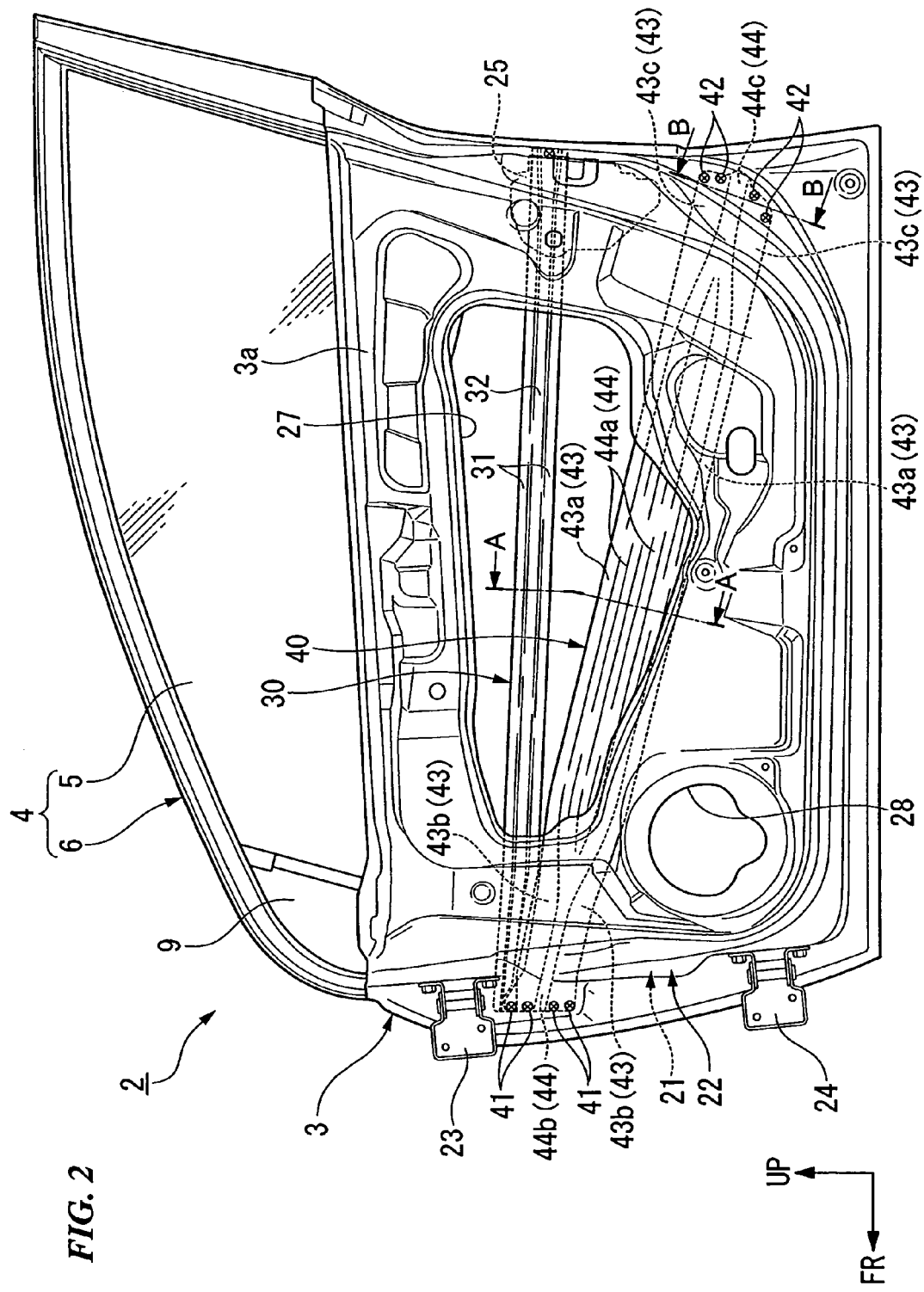
FIG. 2 is a side view showing the front door on the right side of the vehicle in the embodiment, viewed from the inside of the vehicle.

FIG. 2 is a side view showing the front door 2 on the right side of the vehicle, viewed from the inside of the vehicle. The door main body 3 of the front door 2 has a structure in which (i) a door skin 21 (i.e., an outer panel), made by press-molding a steel plate, for forming the outer side (i.e., toward the outside of the vehicle) of the main body 3 on the right side of the vehicle, and (ii) a door inner part 22 (i.e., an inner panel), also made by press-molding a steel plate, for forming the inner side (i.e., toward the interior of the vehicle) of the main body 3 on the right side of the vehicle, are combined integrally due to hemming processing applied to the front, rear, and lower edges thereof. When considering the front door 2 on the left side of the vehicle, the above "right side" should be the "left side". At the upper end portion (i.e., the waist part 3a) of the door main body 3, the door skin 21 and the door inner part 22 are separated from each other, so that the door windowpane 5 can enter and exit a space in the door main body 3 (i.e., a door inner-space) via the gap between the door skin 21 and the door inner part 22.

The sash 6 is made by subjecting a pipe member, having a specific non-uniform section, to bending processing or the like. The front and rear lower ends thereof are inserted into the front and rear ends of the waist part 3a in the door main body 3 from the upper side, and each inserted part and the part which receives it are combined integrally by welding or the like. The mirror base plate 9 is attached integrally between a front end portion of the sash 6 and a front end portion of the waist part 3a by welding or the like.

The front end (i.e., base end) of the door inner part 22 in the door main body 3 is supported at the front end of a side opening of the vehicle body in a freely rotatable manner via an upper hinge 23 and a lower hinge 24. On the other hand, on the inside of the rear end (i.e., free end) of the door main body 3, an electric lock unit 25 is provided which is engageable with a rear portion of the side opening in the vehicle body, in a latch form. When this electric lock unit 25 is latch-engaged with the vehicle body la (i.e., the front door 2 is in a fully-closed state), the free end of the door main body 3 is supported at the rear end of the side opening in the vehicle body.

In a central area of the door inner part 22, a central opening 27 is formed for inserting various door function parts (the above electric lock unit 25, a pane raising and lowering device (not shown), and the like) into the door main body 3. Another opening 28 for attaching a door speaker (not shown) is formed on the front and lower side of the central opening 27.

Inside the door main body 3, a door stiffener 30 and a door beam 40 are arranged between the base end and the free end of the door main body 3.

The door stiffener 30 extends from the substantial vertical center of the front end of the door main body 3 to the substantial vertical center of the rear end of the door main body 3 while its height gradually decreases slightly. The door beam 40 extends from the position immediately under the door stiffener 30 at the front end of the door main body 3 to the lower side of the rear end of the door main body 3 while its height gradually decreases so as to form a steeper slope in comparison with the door stiffener 30.

Figure 3:
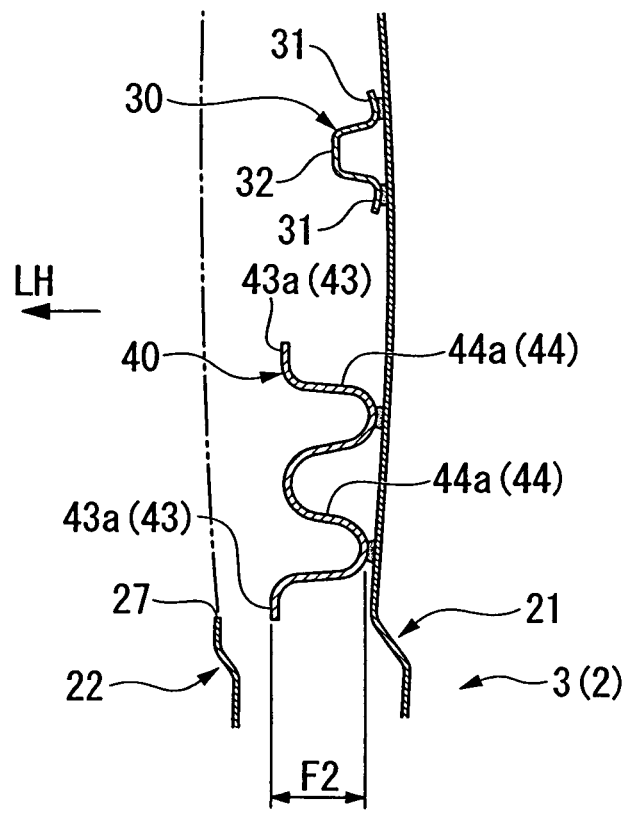
FIG. 3 is a sectional view along line A-A in FIG. 2.

FIG. 3 is a sectional view along line A-A in FIG. 2. The door stiffener 30 extends along the front-to-back direction and has a substantially uniform section (perpendicular to its extending direction) having a hat shape. This door stiffener 30 is made by press-molding a steel plate, and the front and rear ends thereof are connected to the front and rear ends of the door inner part 22 by spot welding applied to each connection spot. The above-described hat-form section of the door stiffener 30 includes a protruding portion 32 having a U-shaped section, which protrudes toward the interior of the vehicle, and is positioned between upper and lower flange portions 31 arranged along the inner face of the door skin 21. A plurality of parts in the upper and lower flange portions 31 are appropriately adhered to the inner face of the door skin 21 via a soft adhesive sealer.

The door beam 40 also extends along the front-to-back direction, where a medium portion in its extending direction (i.e., substantially front-to-back direction along its length) has a substantially uniform section, and both side portions towards the front and rear ends in the extending direction (i.e., the front-to-back direction) each have a sectional shape different from that of the medium portion. Similar to the door stiffener 30, the door beam 40 is also made by press-molding a steel plate, and both ends, that is, the front and rear ends thereof along the extending direction are respectively joined to the front end and the rear end of the door inner part 22 due to spot welding applied to four spots which are aligned vertically at each end. Below, the front spot-welded part and the rear spot-welded part are respectively called "the front joint part 41" and "the rear joint part 42". Here, the uppermost front joint part 41 also functions as a joint part between the front end of the door stiffener 30 and the door inner part 22.

The door beam 40 includes flat parts 43 arranged substantially along a side face of the door, and a groove part 44 which is recessed toward the door skin 21 with respect to the flat parts 43. The flat parts 43 and the groove part 44 extend over the entire length of the door beam 40 along its extending direction. Similar to the sectional form of the door beam 40, the flat parts 43 and the groove part 44 each also varies in its form along the extending direction. In the following explanation, (i) portions of the flat parts 43 and the groove part 44, corresponding to the central part of the door beam 40, may be called "central flat parts 43a" and "central groove parts 44a" (the groove part 44 is divided into two parts in this area), (ii) portions of the flat parts 43 and the groove part 44, positioned at the front side of the door beam 40, may be called "front flat parts 43b" and a "front groove part 44b", and (iii) portions of the flat parts 43 and the groove part 44, positioned at the rear side of the door beam 40, may be called "rear flat parts 43c" and a "rear groove part 44c".

Specifically, with respect to the upper and lower central flat parts 43a arranged along the inner face of the door skin 21, the central groove parts 44a are formed at upper and lower positions in the vertical central part of the door beam 40 and each have a U-shaped section protruding toward the door skin 21. A plurality of parts in the head portion of each central groove part 44a toward the door skin 21 are appropriately adhered to the inner face of the door skin 21 via a soft adhesive sealer.

In order to effectively obtain a desired rigidity of the door beam 40, a large depth and a large vertical width are secured for each central groove part 44a. Accordingly, slightly (remaining) unbent portions at the upper and lower edge of the door beam 40 function as the upper and lower flat parts 43a. The portion between the central groove parts 44a has a U-shaped section, so that this portion and each central groove part 44a both have U-shaped sections which (i.e., the "U" forms) are open toward opposite directions along the axis connecting the inside and outside of the door. That is, the central part of the door beam 40 along the front-to-back direction has a substantial wave-form section. The upper and lower flat parts 43a are separated from the inner face (i.e., facing the door skin 21) of the door inner part 22 by a specific distance.

Below, the rear end portion of the door beam 40 will be explained in detail with reference to FIG. 4, which is a sectional view along line B-B in FIG. 2.

The rear groove part 44c is a single groove part provided at the vertical central part of the door beam 40. The rear flat parts 43c are arranged along a rear beam joint part 47 which is a rear end portion of the door inner part 22, and the rear groove part 44c has a U-shaped section which is recessed toward the door skin part 21. The rear ends of the rear flat parts 43c are spot-welded to the rear beam joint part 47 of the door inner part 22. The head of the rear groove part 44c toward the door skin part 21 is separated from the inner face of the door skin 21 by a specific distance.

The central flat parts 43a and the central groove parts 44a are smoothly joined respectively to the rear flat parts 43c and the rear groove part 44c between the central part and the rear side of the door beam 40 along the longitudinal direction thereof, by gradually conforming the shapes of the joined parts to each other.

Figure 4:
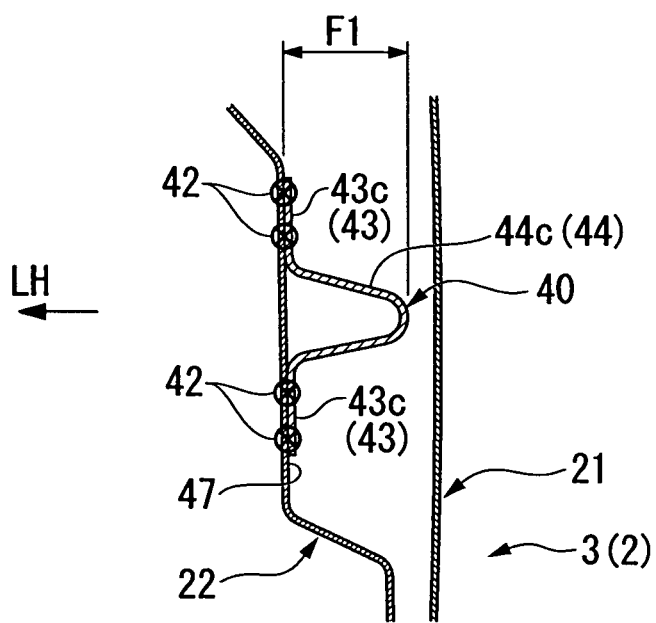
FIG. 4 is a sectional view along line B-B in FIG. 2.

As shown in FIGS. 3 and 4, the depth F1 (along the axis connecting the inside and outside of the door) of the rear groove part 44c is larger than the depth F2 of the central groove parts 44a, in consideration that the number of the grooves is different between the central part and the rear side of the door beam 40. Accordingly, the door beam 40 can have a substantially uniform rigidity from the central part to the rear end, with respect to an impact against the door.

A symmetrical form of the above structure of the rear side of the door beam 40 can be applied to the front side thereof.

Figure 5A:
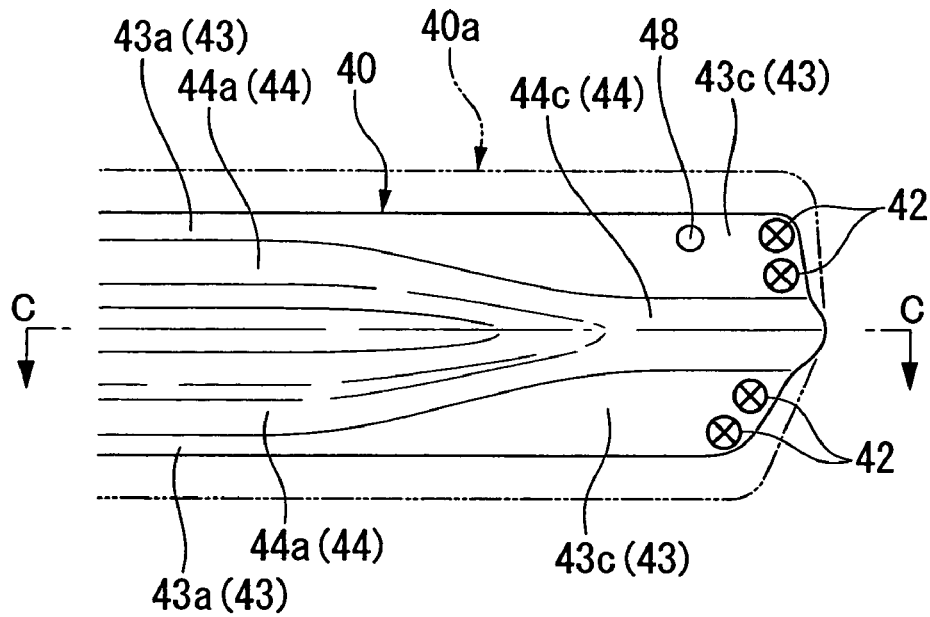
FIG. 5A is a plan view showing the rear side of the door beam in the front door of FIG. 2.
Figure 5B:
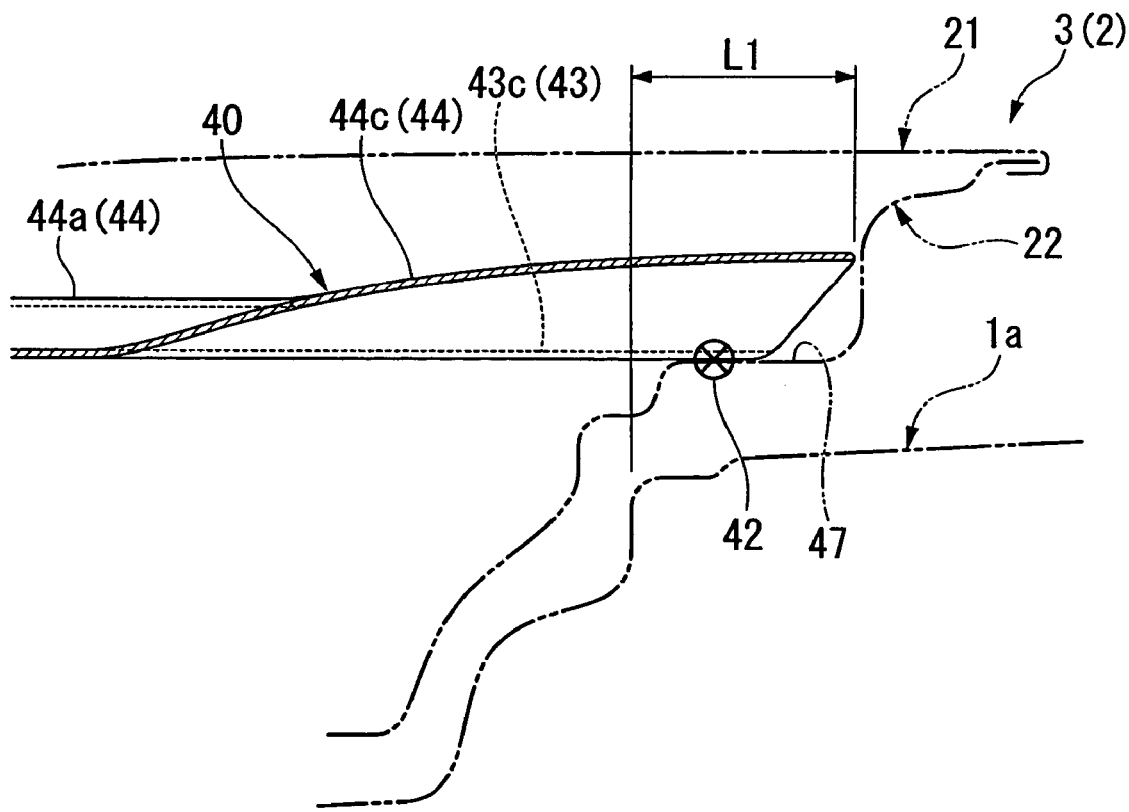
FIG. 5B is a sectional view along line C-C in FIG. 5A.

FIG. 5A is a plan view showing the rear side of the door beam 40 in the above front door 2 on the right side of the vehicle, and FIG. 5B is a sectional view along line C-C in FIG. 5A.

As shown in FIGS. 5A and 5B, in plan view (showing the planes of the flat parts 43), the rear end of the door beam 40 has an angle form protruding outward (i.e., toward the back side) along the extending direction of the beam, so that the rear end can easily conform to the curved shape at the lower side of the rear end of the door inner part 22 (see FIG. 2). In this form, the rear end of the groove part 44 positioned at the vertical center protrudes from the rear end positions of the upper and lower flat parts 43 (which are a base part of the door beam 40) outward (i.e., toward the back side) along the extending direction of the beam.

The rear end of the door beam 40 is welded to the rear beam joint part 47 in a manner such that the upper and lower flat parts 43 contact the rear beam joint part 47. The rear ends of the upper and lower flat parts 43 do not exceed the rear beam joint part 47 which is flat, so that they do not touch an R-shaped (i.e., curved) part in the vicinity of the rear beam joint part 47. With respect to such rear ends of the upper and lower flat parts 43, that is, the rear joint parts 42 joined to the door inner part 22, the groove part 44 further extends backward, where it functions as the main rigid body in the event of an impact against the door. Accordingly, the effective lap width L1 between the door beam 40 and the vehicle body 1a along the beam extending direction can be increased.

Figure 6A:
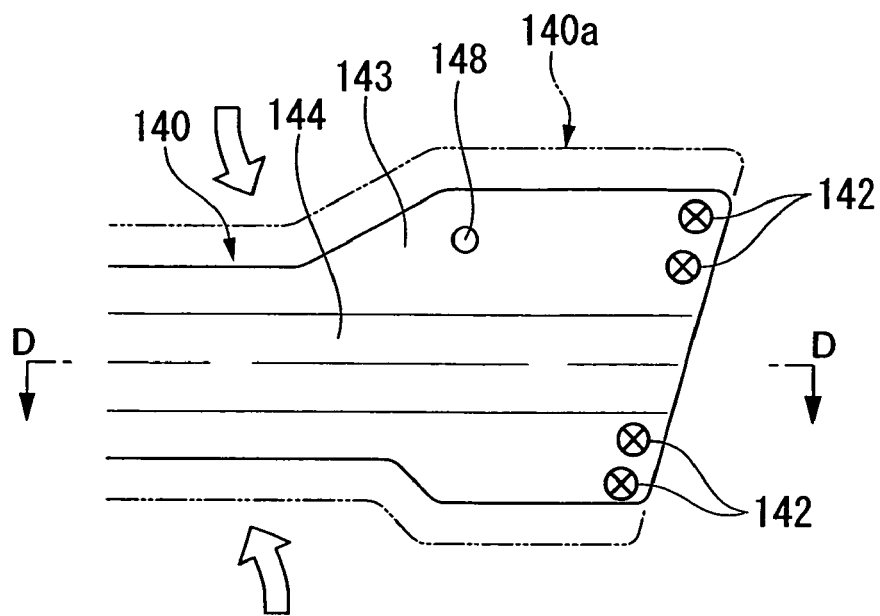
FIG. 6A is a plan view showing the rear side of a door beam as a conventional example.
Figure 6B:
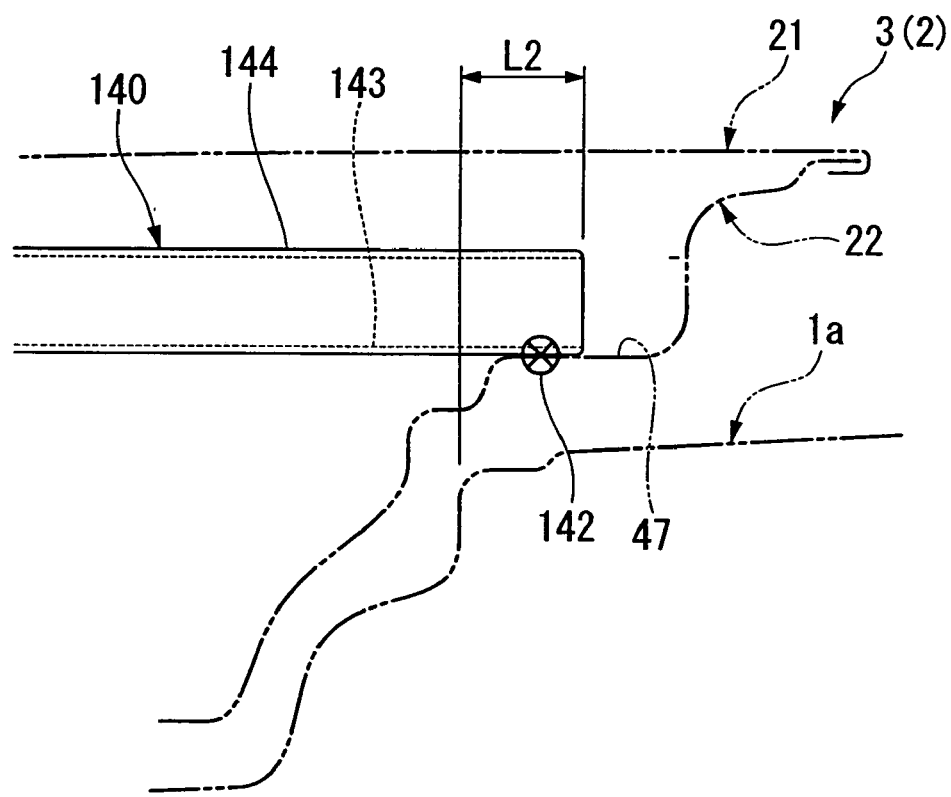
FIG. 6B is a sectional view along line D-D in FIG. 6A.

FIG. 6A is a plan view showing the rear side of a door beam 140 as a conventional example, and FIG. 6B is a sectional view along line D-D in FIG. 6A.

This door beam 140 is formed by press-molding, and has a groove part 144 formed at the vertical center of the beam. The groove part 144 has substantially uniform vertical width and groove depth, up to the rear end of the groove, that is, has a substantially uniform section.

In addition, upper and lower flat parts 143 of the door beam 140 each expand outward in the vertical direction, so as to increase the vertical width of the flat parts. This is for securing a spot-welded part at the rear side of the door beam 140 while reducing the weight by providing the possibly minimum section to the central part along the longitudinal direction of the beam. In FIG. 6A, reference numeral 148 indicates a locating hole used for the welding.

In plan view (see FIG. 6A), the rear end of the door beam 140 forms a straight line slightly inclined with respect to the direction perpendicular to the longitudinal direction of the beam. Accordingly, the rear end of groove part 144 does not protrude from the rear end of the door beam 140, that is, from the rear ends of the upper and lower flat parts 143; thus, it ends before it touches an R-shaped part in the vicinity of the rear beam joint part 47, together with the upper and lower flat parts 143. Therefore, it does not further extend from the position of the rear joint parts 142 joined to the door inner part 22, and thus does not increase the lap width L2 between the door beam 140 and the vehicle body 1a in this case.

In FIG. 6A, alternate long and two short dashed lines indicate a developed shape of the door beam 140, that is, the outer shape of a base material 140a of the door beam 140 before it is subjected to the press-molding. As the upper and lower flat parts 143 on the front and rear sides of the door beam 140 are each shaped to have a larger width, wasted areas are present at the upper and lower sides of the central part of the base material 140a along the longitudinal direction (see thick arrows in FIG. 6A).

In contrast, as shown in FIG. 5A, in the door beam 40 of the present embodiment, a plurality of groove parts 44 in the central part along the longitudinal direction is gradually transformed into a single groove part 44 having a smaller vertical width in comparison with the groove parts 44 in the central part. Therefore, the upper and lower flat parts 43 on the rear side of the door beam 40 have vertical widths expanded toward the vertical center; thus, a desired width for the spot-welding can be secured at the rear side of the door beam 40 without the upper and lower flat parts 43 at the rear side protruding outward in the vertical direction.

Also in the door beam 40, the number and depth of grooves are not uniform between the central part and the rear side; thus, the developed shape (see alternate long and two short dashed lines in FIG. 5), that is, the shape of a base material 40a before it is subjected to the press-molding has substantially straight upper and lower edges. Therefore, in comparison with the conventional door beam 140, it is possible to considerably reduce wasted areas with respect to the base material subjected to the press-molding. In FIG. 5A, reference numeral 48 indicates a locating hole used for the welding.

In addition, as the rear end of the groove part 44 is protruded outward in the beam extending direction, the rear end of the door beam 40 has an angle form with respect to the flat parts 43 in plan view. Therefore, when the rear joint parts 42 for connecting the door beam 40 to the door inner part 22 are arranged in conformity with the slopes of the angle form, a sufficient pitch can be easily secured between the rear joint parts 42. Accordingly, in comparison with the straight form of the rear end of the conventional door beam 140, it is possible to further reduce the vertical widths of the upper and lower flat parts 43 on the rear side of the door beam 40.

As explained above, the door beam structure of the above embodiment is applied to the door beam 40 arranged inside the door main body 3 of the front door 2 in the vehicle 1. The door beam 40 is press-molded, and has the recessed groove part 44 arranged along the extending direction of the beam, where the rear end of the groove part 44 protrudes from the rear end of the door beam 44 along the extending direction thereof.

In accordance with the above structure, only the groove part 44 having high rigidity is protruded from the rear end of the door beam 40, thereby increasing the effective lap width between the door beam 40 and the vehicle body 1a by the protruding length of the groove part 44. Therefore, it is possible to improve the rigidity in the event of an impact against the door while the weight of the door beam 40 can be reduced. In addition, the groove part 44 can protrude from the rear end of the door beam 40 (i.e., after the press-molding) in accordance with the cut shape of the base member 40a (i.e., before the press-molding), thereby allowing simplification of the manufacturing process of the door beam 40.

Additionally, in the groove part 44 of the above door beam structure, the depth of the groove at the rear end thereof is larger than that of the central part thereof in its extending direction. Therefore, such a shallow groove in the central part contributes to space-saving in the central part of the door beam 40 in its extending direction, while such a deep groove in the rear end part contributes to improving the rigidity in the event of an impact against the door.

Also in the groove part 44 of the above door beam structure, the central part in its extending direction has a plurality of groove lines, and they are gradually transformed into and joined to a single groove at the rear end of the groove part 44. That is, a plurality of relatively shallow grooves are formed in the central part in the extending direction of the door beam 40 so as to provide desired rigidity and a space-saving effect. In contrast, at the rear end of the door beam 40, a relatively deep single groove is formed so that relatively wide flat parts 43 can be secured for fastening the door beam 40 to the door main body 3. Therefore, the rigidity of the door beam 40 can be secured uniformly along its extending direction, and simultaneously, a sufficient width for fastening the door beam 40 to the door main body 3 can be secured without increasing the vertical width of the rear end of the door beam 40. Accordingly, it is possible to increase the yield with respect to the press-molding of the door beam.

Additionally, in the door beam 40 having the above door beam structure, the groove part 44 protrudes outward in its extending direction from the position of the rear joint parts 42 for connecting the rear end of the door beam 40 to the door main body 3; thus, the rear joint parts 42 are not formed excessively close to the rear edge of the door beam 40. Therefore, the door beam 40 can be stably fastened, and the protruding groove part 44 contributes to improving the rigidity in the event of an impact against the door.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the front side of the door beam 40 may have a structure similar to that of the rear side, and a similar structure can also be applied to the rear door.

What is claimed is:

1. A structure of a door beam arranged inside a main body of a door in a vehicle, wherein:
    the door beam is press-molded;
    a recessed groove part is formed in the door beam along its extending direction;
    and during the press-molding, an end of the groove part is made to protrude further outward at an end of the door beam in the extending direction, in comparison with corresponding ends of upper and lower parts which interpose the groove part.

2. The structure of the door beam in accordance with claim 1, wherein in the groove part, an end part has a deeper groove in comparison with a groove in a central part along the extending direction.

3. The structure of the door beam in accordance with claim 1, wherein in the groove part, a plurality of grooves are formed in a central part along the extending direction, and said grooves are gradually transformed into a single groove in an end part along the extending direction.

4. The structure of the door beam in accordance with claim 1, wherein the groove part protrudes outward in the extending direction, from a joint part of the door beam, which is provided for joining said ends of the door beam to the main body of the door.

5. The structure of the door beam in accordance with claim 1, wherein upper and lower edges of the door beam are each substantially planar over the entire length of the beam, and are substantially coplanar with one another.

6. The structure of the door beam in accordance with claim 1, wherein a base material used during press-molding of the door beam has upper and lower edges which are each substantially planar over the entire length of the base material, and which are substantially coplanar with one another.

7. A structure of a door beam arranged inside a main body of a door in a vehicle, wherein:
    the door beam is press-molded;
    a recessed groove part is formed in the door beam along its extending direction; and
    during the press-molding, an end of the groove part is made to protrude further outward from an end of the door beam in the extending direction, in comparison with corresponding ends of upper and lower parts which interpose the groove part,
    wherein in the groove part, a plurality of grooves are formed in a central part along the extending direction, said grooves are gradually transformed into a single groove in an end part along the extending direction, and an end part has a deeper groove in comparison with a groove in a central part along the extending direction.

8. The structure of the door beam in accordance with claim 7, wherein a front end of the door beam is mounted to the vehicle door at a location that is higher, in the gravitational direction, than the location of the mounting location of a rear part of the door beam.

9. The structure of the door beam in accordance with claim 7, wherein the groove part extends along the entire length of the door beam.

10. The structure of the door beam in accordance with claim 7, wherein the depth of the groove at the end part is at least 1.5 times the depth of the groove at the central part.

11. The structure of the door beam in accordance with claim 7, wherein the beam is disposed such that the grooves at the central and end parts extend in the direction of the outer portion of the door, and wherein the surface of the beam facing a door inner portion is substantially flat, there being no groove protruding in this direction.

12. A structure of a door beam arranged inside a main body of a door in a vehicle, said door beam comprising a shaped panel member extending in a substantially front-to-back direction of the vehicle, said door beam being disposed in the door between an outer door skin and a door inner part spaced inwardly away from the outer door skin, said door beam having a front end, a rear end and a medial portion disposed between the front end and the rear end; wherein:

the door beam is press-molded so as to define a plurality of grooves therein, including a substantially recessed groove part formed in the door beam along its extending direction, wherein a portion of said recessed groove part is formed substantially in a sideways Y shape and includes two branch portions disposed at the medial portion of the door beam, the branch portions converging into a single groove portion extending towards a rear end of the door beam, wherein the single groove portion is disposed rearwardly of the branch portions.

13. The structure of the door beam in accordance with claim 1, wherein an end of the groove part at an end portion of the door beam extends outwardly towards an outer portion of the door.

14. The structure of the door beam in accordance with claim 7, wherein an end of the groove part at an end portion of the door beam extends outwardly towards an outer portion of the door.

15. The structure of the door beam in accordance with claim 12, wherein an end of the groove part at an end portion of the door beam extends outwardly towards an outer portion of the door.

* * * * *